Figure 1:
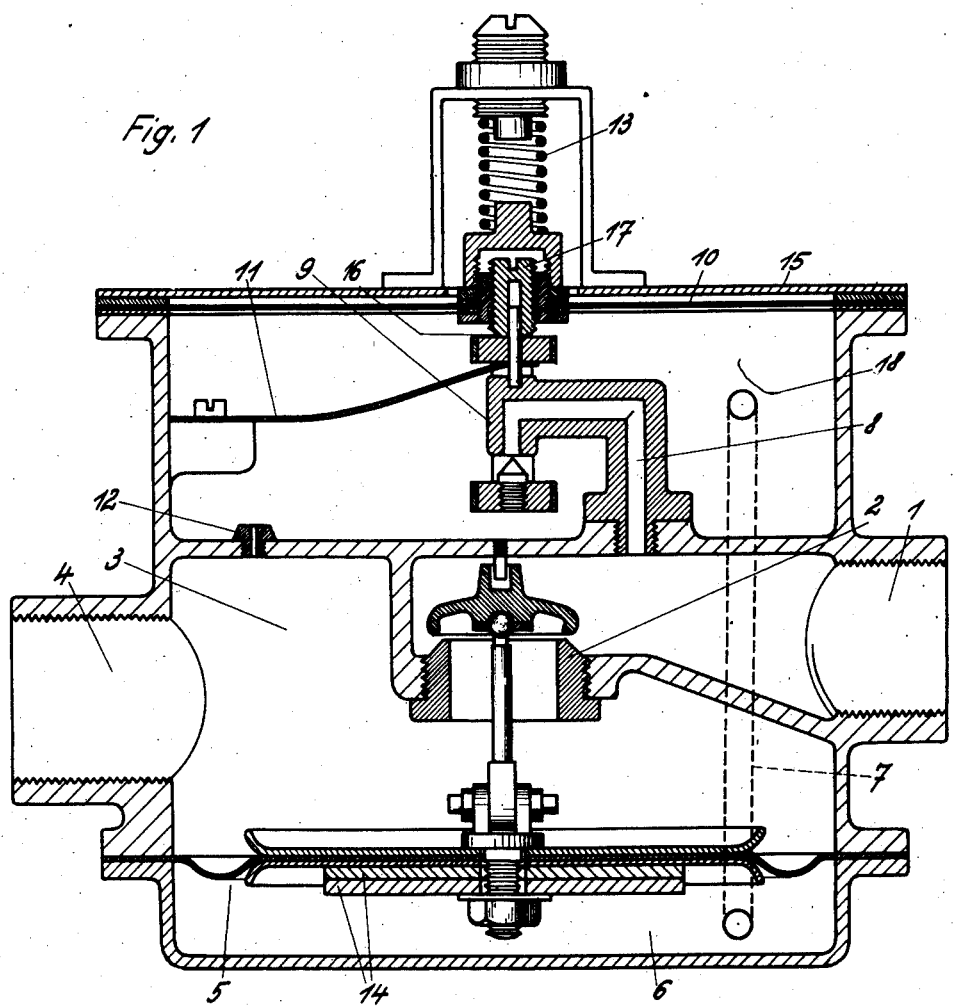

Patented Dec. 15, 1931

1,837,086

UNITED STATES PATENT OFFICE

JOHANN FRIEDRICH von SCHÜTZ, OF BERLIN, GERMANY

GAS PRESSURE REGULATOR

Application filed February 19, 1929, Serial No. 341,197, and in Germany October 29, 1927.

This invention relates to a gas pressure regulator, more particularly for use in living rooms, having a control pressure regulator.

Gas pressure regulators of the diaphragm type which are fitted in living rooms require special guard means to counteract the danger of the diaphragm assuming in the course of time tendency to leakage. In many cases the space above the diaphragm, which space requires to be in communication with the atmosphere, is furnished with a special deaereation pipe leading to a discharge passage or the like. The desire to dispense as far as possible with this pipe in apartments etc. matures into the idea of leaving the space in question in communication with the atmospheric air, i. e. that contained in the room etc., and to employ as safety means a diaphragm having particular resistive capabilities, this diaphragm preferably being composed of sheet metal which does not rust.

Diaphragms of this type perform only a very small stroke, which in itself would not be sufficient to actuate the regulating valve. The invention as described in the following permits, however, the regulator to be entirely closed off against the atmosphere, a metal diaphragm being mounted on a control regulator, the branch current of which in the manner known per se is returned into the consumption pipe and controls a working diaphragm of the regulator valve situated in the gas space. The series connection of a control regulator known per se and otherwise effected in order to increase the sensitiveness is accordingly in this case also performed as a guard means. By reason of the small stroke of the metal diaphragm the possibility is at the same time created of making the connection aperture between cover chamber and atmosphere particularly small, as only very little air is required to pass in and out upon the operation of the diaphragm. This offers advantages because even should the diaphragm be damaged the amount of gas passing out of the cover space will be so small as to remain without detrimental effect. The control regulator may be mounted above the main regulator within the same casing.

In such an arrangement there is, for example, the possibility of maintaining, by means of the control regulator, the auxiliary pressure acting on the working diaphragm at a constant level, viz., at such an amount that the same is somewhat higher than the consumption pressure. The control regulator is accordingly required to regulate a branch current to this control pressure, which is to be adjusted with the assistance of the load on the control diaphragm. The working diaphragm is loaded by means of weights to such extent that the same is maintained in balance by the control pressure which, in the particular embodiment shown, acts from below. The working diaphragm is then controlled by the consumption pressure in similar manner to the diaphragm of an ordinary regulator, as merely the likewise invariable control pressure takes the place of atmospheric pressure.

The invention will now be described more fully with reference to the accompanying drawing, in which:

The figure is a longitudinal cross section of the gas pressure regulator and control regulator.

This figure shows by way of example a regulator of the kind in question, in which the control regulator is fitted on the casing of the main regulator. The gas introduced through the socket 1 passes through the main valve 2 into the chamber 3 and to the discharge socket 4. The main valve 2 communicates with the working diaphragm 5. The space 6 below the working diaphragm 5 communicates by means of the pipe 7 with the separate space 18 below the metallic diaphragm 10 of the control regulator. The control regulator receives the gas under preliminary pressure through the pipe 8. In order to obtain the easiest possible movability of the control regulator valve, this valve is not in fixed connection with the diaphragm 10 but is pressed against the same by means of a spring 11. The distance between the diaphragm 10 and the bearing surface 16 of the valve may be adjusted by means of a screw 17, which is mounted on the diaphragm 10 and is accessible from the exterior, and which is guarded against gas escape by means of a cap. The branch current of the control regulator valve flows via the throttling point comprising a restricted opening 12 into the chamber 3 and from there into the discharge pipe 4.

The operation is as follows: The control regulator is loaded in such manner by means of the loading spring 13 that the pressure created through pipes 7 and 8 in the space 6 is slightly more than the desired initial pressure in the space 3 and is equal to the pressure resulting from the weight of the working diaphragm 5 including the loading weights 14. If gas is not removed from the consumption or discharge pipe 4, the pressure in space 3 increases to the level of the pressure in the space 6, so that the main valve 2 moves toward its seat under its own weight and the load 14, and is thus closed. When gas is again removed from the space 3, the pressure in the same decreases only to such extent until the main valve 2 with the assistance of the diaphragm 5 has again been opened by the constant pressure in the space 6. Should the diaphragm 10 be ruptured, the pressure in the space 6, if the intake pipe is made sufficiently small, will drop, so that the valve 2 is unable to open. The damage will be readily recognizable by lack of pressure in the space 3.

It will be understood that no restriction is made to the exact form of embodiment shown, and that various modifications may be made without departing from the spirit of the invention.

What I claim as new and desire to secure by Letters Patent is:

A gas pressure regulator comprising a casing, an inlet chamber and an outlet chamber provided in the lower part of said casing, a passage between the two said chambers, a main reducing valve mounted in said passage, a main diaphragm of relatively large diameter capable of substantial displacement mounted in said outlet chamber, said main reducing valve being in operative relation with the said diaphragm, and mounted to permit a universal or pivoting movement with respect to said diaphragm, in order that the valve may properly control the flow of gas through said passage regardless of any irregularity in movement of said diaphragm, a regulating chamber in communication with the inlet chamber, a bleed opening through which the outlet chamber communicates with said regulating chamber, the differential gas pressure existing in the said regulating chamber and in said outlet chamber operating to control the position of said main diaphragm, an auxiliary diaphragm made of metal and mounted in said regulating chamber so as to perform relatively small displacements with respect to those of the main diaphragm, and an auxiliary valve controlled by said metallic diaphragm operating to control the admission of gas into said regulating chamber on one side of said metallic diaphragm.

In testimony whereof I have affixed my signature.

JOHANN FRIEDRICH v. SCHÜTZ.